US007693963B2

(12) United States Patent
Johnson et al.

(10) Patent No.: US 7,693,963 B2
(45) Date of Patent: Apr. 6, 2010

(54) TECHNICAL SUPPORT PROCESS FOR POWER MONITORING NETWORKS

(76) Inventors: Anthony Johnson, 2306 Sawmill St., Murfreesboro, TN (US) 37128; Tuan Ta, 8525 Gainsford La., Nolensville, TN (US) 37135

(*) Notice: Subject to any disclaimer, the term of this patent is extended or adjusted under 35 U.S.C. 154(b) by 310 days.

(21) Appl. No.: 11/891,712

(22) Filed: Aug. 13, 2007

(65) Prior Publication Data

US 2009/0049126 A1 Feb. 19, 2009

(51) Int. Cl.
 *G06F 15/16* (2006.01)
(52) U.S. Cl. ....................................... 709/219
(58) Field of Classification Search ................. 709/219
 See application file for complete search history.

(56) References Cited

U.S. PATENT DOCUMENTS

| | | | | |
|---|---|---|---|---|
| 2002/0019815 A1* | 2/2002 | Branson et al. | ................. | 706/1 |
| 2006/0184614 A1* | 8/2006 | Baratto et al. | ................. | 709/203 |
| 2007/0055643 A1* | 3/2007 | Iwatsu et al. | .................... | 707/1 |
| 2008/0238701 A1* | 10/2008 | Bickel et al. | ................. | 340/635 |

* cited by examiner

*Primary Examiner*—Quang N. Nguyen
*Assistant Examiner*—Tesfay Yohannes

(57) ABSTRACT

A technical support process is provided for multiple electrical power monitoring systems, each of which has multiple types of devices coupled to a common server through a network. A technical support group is provided at one or more locations remote from the power monitoring systems and associated with the manufacturer of at least certain of the devices in the power monitoring systems. The owners of the power monitoring systems and the common servers are provided with access to the remote technical support group so that the owners can request technical support from that group to solve a reported problems with the power monitoring systems. When an owner of one of the power monitoring systems requests technical support from the remote group, that owner is provided with a portable storage medium. The common server for the power monitoring system for which technical support was requested is then virtualized, the resulting virtualized server is loaded onto the portable storage medium, and that storage medium is delivered to the remote technical support group. The remote group uses the virtualized server to analyze the owner's actual server and arrive at a solution to the reported problem.

4 Claims, 1 Drawing Sheet

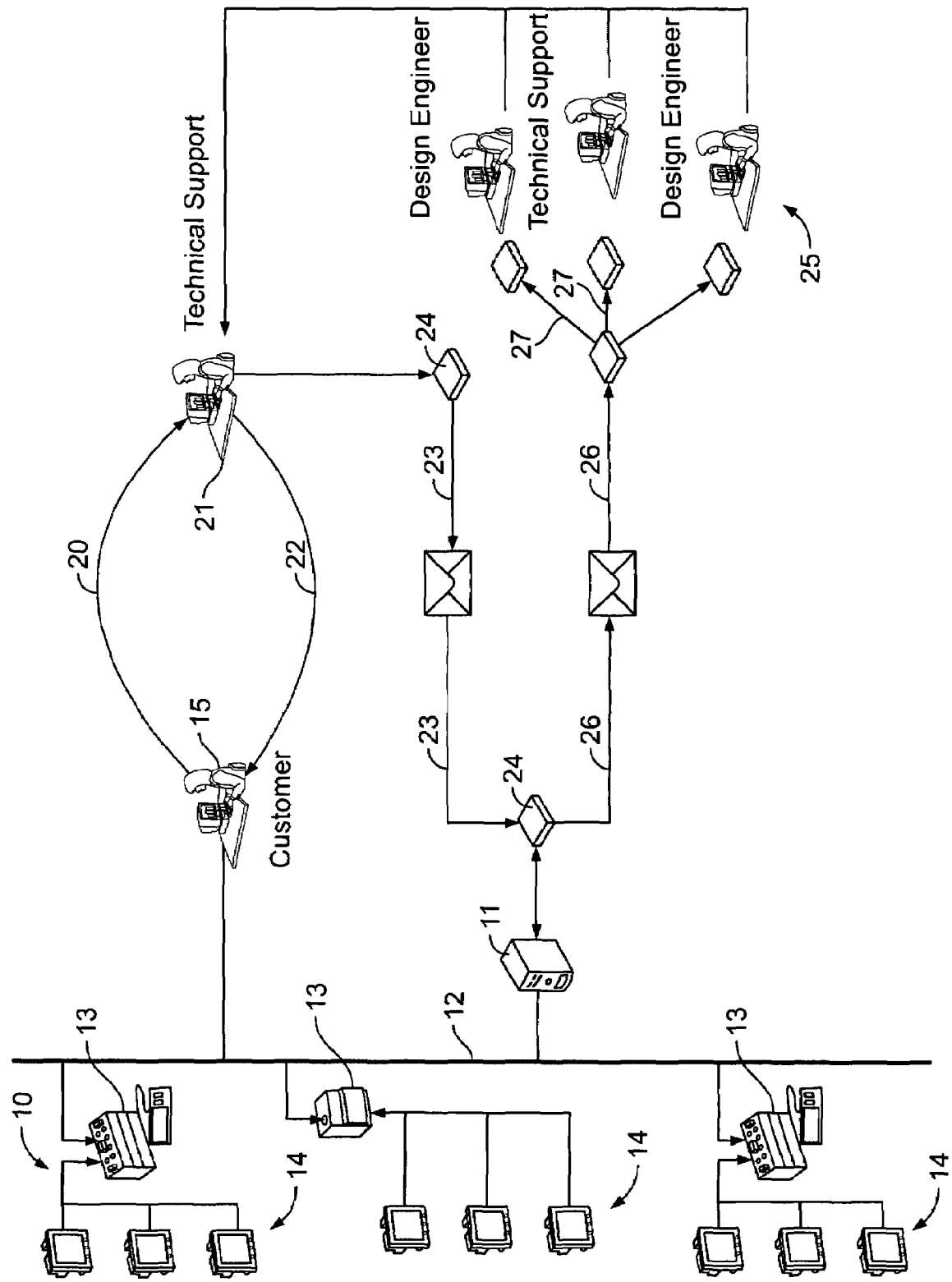

TECHNICAL SUPPORT PROCESS FOR POWER MONITORING NETWORKS

FIELD OF THE INVENTION

The present invention relates generally to power monitoring systems and, more particularly, to a technical support process for power monitoring networks.

BACKGROUND OF THE INVENTION

An electrical power monitoring system typically includes metering devices, communication devices, workstations and a server, all of which are networked. The metering devices measure critical circuits, alarm on set conditions and log data. The communication devices connect the metering devices to a standard local area network ("LAN"). The server stores the data in a data base for reporting and trending electrical usage and anomalies. The workstations allow users access to the data stored on the server. These power monitoring networks are complex and typically custom designed for each facility. Each system is unique in its application and usage.

When a customer has a power monitoring system problem that cannot be solved by the customer's personnel, the customer contacts the technical support staff of the manufacturer of the power monitoring equipment. That technical support staff typically connects to the customer's system via a remote connection and executes a trouble shooting process. On occasions the problem is too difficult for the technical support staff to solve, and thus design engineers travel to the customer's site to investigate the issue. It is often difficult to determine the correct individuals to send to the customer's site for a given problem. Due to the complexity of power monitoring systems, there is often no one individual who is an expert on all aspects of a given system. Additionally, these are active systems collecting crucial data, and thus there are limitations to what can be done to the customer's system without putting the data collection process at risk.

SUMMARY OF THE INVENTION

In one embodiment, a technical support process is provided for multiple electrical power monitoring systems, each of which has multiple types of devices coupled to a common server through a network. A technical support group is provided at one or more locations remote from the power monitoring systems and associated with the manufacturer of at least certain of the devices in the power monitoring systems. The owners of the power monitoring systems and the common servers are provided with access to the remote technical support group so that the owners can request technical support from that group to solve a reported problems with the power monitoring systems. When an owner of one of the power monitoring systems requests technical support from the remote group, that owner is provided with a portable storage medium. The common server for the power monitoring system for which technical support was requested is then virtualized, the resulting virtualized server is loaded onto the portable storage medium, and that storage medium is delivered to the remote technical support group. The remote group uses the virtualized server to analyze the owner's actual server and arrive at a solution to the reported problem. The solution is implemented by remotely accessing the owner's server that was virtualized.

In one implementation, the remote technical support group includes multiple experts having knowledge in different areas of specialization, and the virtualized server is cloned to permit multiple experts to work on the virtualized server simultaneously.

BRIEF DESCRIPTION OF THE DRAWING

The invention may best be understood by reference to the following description taken in conjunction with the accompanying drawing, in which the single FIGURE is a diagrammatic illustration of a networked power monitoring system and an associated technical support system embodying the present invention.

DETAILED DESCRIPTION OF THE ILLUSTRATED EMBODIMENT

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Turning now to the drawing, the single FIGURE illustrates a technical support process for a single electrical power monitoring system 10 having multiple circuit monitors and power metering units coupled to a common server 11 through a network 12. The network 12 is an Ethernet network or some other form of private LAN, which is typically coupled to a WAN that can include multiple work stations and/or personal computers. The server 11 provides gateway functions by allowing access to the multiple intelligent devices included in the network 12. The server may also be programmed to operate as a web server, allowing access to HTML pages via standard web browsers. The server 11 organizes data relating to the power monitoring equipment itself, as well as characteristics of the electrical power flowing through the monitoring and metering equipment. Information relating to the electrical power flowing through the equipment includes logged measurements, breaker operations, alarms/events and abnormal current and voltage waveforms. The server 11 may also receive alert or alarm signals or messages when a monitoring device detects certain conditions, such as a non-responding circuit breaker, a controller reset, a communication loss and the like.

The exemplary monitoring and metering devices illustrated are circuit monitors 13 (e.g., "PowerLogic" CM3000 and CM4000 circuit monitors) equipped with communication cards that interface with the network 12, and multiple individual power meters 14 daisy-chained with individual circuit monitors 13. The power monitoring network may also include devices such as a "PowerLogic" System Manager and circuit breaker controllers, and may be implemented with any of a variety of different protocols and hardware.

The network 12 also includes a workstation 15 in the facilities of the owner of the power monitoring system. One of the functions of the workstation 15 is to enable a user to receive reports of problems in the power monitoring system and to attempt to arrive at solutions for such problems. Because of the complex nature of many power monitoring networks, the technical support issues that arise can also be complex. When a problem cannot be resolved by the personnel available in the owner's facilities, assistance is often sought from the manufacturer(s) of the equipment and/or software used in the power monitoring system, as indicated by the arrow 20 in the drawing.

The manufacturer typically has a technical support group that includes multiple experts having knowledge in different areas of specialization, all of whom are, of course, at locations remote from the customers' power monitoring systems. Sometimes design engineers must also be involved in the trouble shooting process, and these engineers may be located in different facilities. Purchasers of the manufacturer's equipment can request the manufacturer's technical support group to solve reported problems with the purchaser's power monitoring system.

A workstation 21 in the manufacturer's facilities is typically used to communicate with personnel at the owner's workstation 15 (see arrow 22 in the drawing), including the communication of solutions that can be recommended on the basis of the information received from the owner. Certain reported problems, however, cannot be analyzed by the manufacturer without having more detailed information about the power monitoring system, which sometimes is contained only in the server 11 for the network with the problem. The manufacturer's technical support personnel and design engineers can travel to the customer's facility to do trouble shooting on-site, but this is a costly process.

As depicted by arrows 23 in the drawing, trouble shooting of problems reported to the manufacturer's technical support group is facilitated by providing the owner with a portable storage medium 24, such as a portable hard drive. The owner then connects the portable storage medium to the server 11 and installs a standard server virtualization program to virtualize the server 11 for the power monitoring system for which technical support was requested. The resulting virtualized server is loaded onto the portable storage medium 24, which is then shipped to the manufacturer's technical support group 25 (see arrows 26 in the drawing). The virtualized server is then used by the manufacturer's technical support group to analyze the owner's server 24 and arrive at a solution to the reported problem.

Virtualization programs, such as "VMware" available from VMware Inc. in Palo Alto, Calif., emulate a complete computer system to allow a "guest" operating system to be run, such as allowing Linux to run as a "guest" on a workstation running a Windows operating system. Server virtualization programs can allow applications written for one operating system to be executed on a machine that runs a different operating system, or to be executed on a machine that is isolated from the actual installed system that has been virtualized.

To permit multiple engineers and other technical support personnel to have simultaneous access to the virtualized server, it may be cloned to produce multiple copies so that different independent trouble shooting paths can be followed simultaneously (see arrows 27 in the drawing). When the reported problem has been solved by the manufacturer's technical support team, the solution may be implemented by remotely accessing the owner's server that was virtualized and executing whatever remedial operations are required.

The use of the virtualized server permits various operations to be carried out on the virtualized server without putting the owner's server at risk. For example, customized debugging programs can be loaded onto the virtualized server, without interfering in any way with the operation of the owner's actual power monitoring system.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A technical support process for multiple electrical power monitoring systems each of which has multiple types of devices coupled to a common server through a network, said process comprising
   providing a technical support group at one or more locations remote from said power monitoring systems and associated with the manufacturer of at least certain of said devices in said power monitoring systems,
   providing the owners of said power monitoring systems and said common servers with access to said remote technical support group so that said owners can request technical support from said group to solve a reported problems with said power monitoring systems,
   providing a portable storage medium to an owner of one of said power monitoring systems when that owner requests technical support from said remote technical support group for a reported problem with that power monitoring system,
   virtualizing said common server for said power monitoring system for which technical support was requested, loading the resulting virtualized server onto said portable storage medium, and providing that storage medium to said remote technical support group,
   using said virtualized server within said remote technical support group to analyze said server to arrive at a solution to the reported problem for which technical support is requested, and
   implementing said solution by accessing said common server that was virtualized.

2. The technical support process of claim 1 in which said remote technical support group includes multiple experts having knowledge in different areas of specialization, and which includes cloning said virtualized server by said remote technical support group to permit said multiple experts to work on said virtualized server simultaneously.

3. The technical support process of claim 1 in which said portable storage medium is a portable hard drive.

4. The technical support process of claim 1 in which said solution is implemented by remotely accessing said common server that was virtualized.

* * * * *